United States Patent
Huo et al.

(10) Patent No.: US 8,189,886 B2
(45) Date of Patent: May 29, 2012

(54) METHOD FOR DETECTING ANATOMICAL STRUCTURES

(75) Inventors: Zhimin Huo, Pittsford, NY (US); Mantao Xu, PuDong District (CN); Jing Zhang, HuangPu District (CN)

(73) Assignee: Carestream Health, Inc., Rochester, NY (US)

( * ) Notice: Subject to any disclaimer, the term of this patent is extended or adjusted under 35 U.S.C. 154(b) by 895 days.

(21) Appl. No.: 12/190,616

(22) Filed: Aug. 13, 2008

(65) Prior Publication Data
US 2010/0040275 A1   Feb. 18, 2010

(51) Int. Cl.
*G06K 9/00* (2006.01)
(52) U.S. Cl. ....................................................... 382/128
(58) Field of Classification Search .................... 382/128
See application file for complete search history.

(56) References Cited

U.S. PATENT DOCUMENTS

| | | | | |
|---|---|---|---|---|
| 5,610,966 | A * | 3/1997 | Martell et al. | 378/58 |
| 7,991,210 | B2 * | 8/2011 | Peterson et al. | 382/131 |
| 2004/0109594 | A1 * | 6/2004 | Luo et al. | 382/132 |
| 2004/0109595 | A1 * | 6/2004 | Luo et al. | 382/132 |
| 2005/0281447 | A1 * | 12/2005 | Moreau-Gobard et al. | 382/130 |
| 2006/0050991 | A1 * | 3/2006 | Jerebko et al. | 382/300 |
| 2007/0237373 | A1 | 10/2007 | Kiraly et al. | 382/128 |
| 2008/0075345 | A1 * | 3/2008 | Unal et al. | 382/131 |
| 2008/0292169 | A1 * | 11/2008 | Wang et al. | 382/131 |

OTHER PUBLICATIONS

Dee Method: Endotracheal Tubes: Alternative Method for Locating Carina, Interpretation of the ICU Chest Film, University of Virginia, 1999 (http://www.med-ed.virginia.edu/courses/rad/chest/lines_ett4.htm).*
Jain, et al., Machine Vision, McGraw-Hill, Inc., chapter 6, 1995.*
Tim Cootes in *Image Processing and Analysis*, Ed. R. Baldock and J. Graham, Oxford University Press, 2000, chapter entitled "Model-Based Methods in Analysis of Biomedical Images" pp. 223-248.
Zhimin Huo, "Computer Aided Tube and Tip Detection," U.S. Appl. No. 11/644,858, filed Dec. 22, 2006.
Huo et al., "Image Analysis of Tube Tip Positioning," U.S. Appl. No. 11/942,021, filed Nov. 19, 2007.
Zhimin Huo, "Computer-Aided Interpretation of ICU Portable Chest Images: Detection of Endo-Tracheal Tubes," U.S. Appl. No. 12/172,283, filed Jul. 14, 2008.

* cited by examiner

*Primary Examiner* — Rodney Fuller

(57) ABSTRACT

A method for estimating the location of an anatomical structure in a diagnostic image of a patient obtains the x-ray data in digital format and detects a first benchmark feature within the x-ray image. A second benchmark feature within the x-ray image is detected. An intersection is located between a first line that extends along the length of the first benchmark feature and a second line that extends from a central point related to the curvature of the second benchmark feature and that intersects with the first line at an angle that is within a predetermined range of angles. The location of the anatomical structure is identified relative to the intersection.

15 Claims, 14 Drawing Sheets

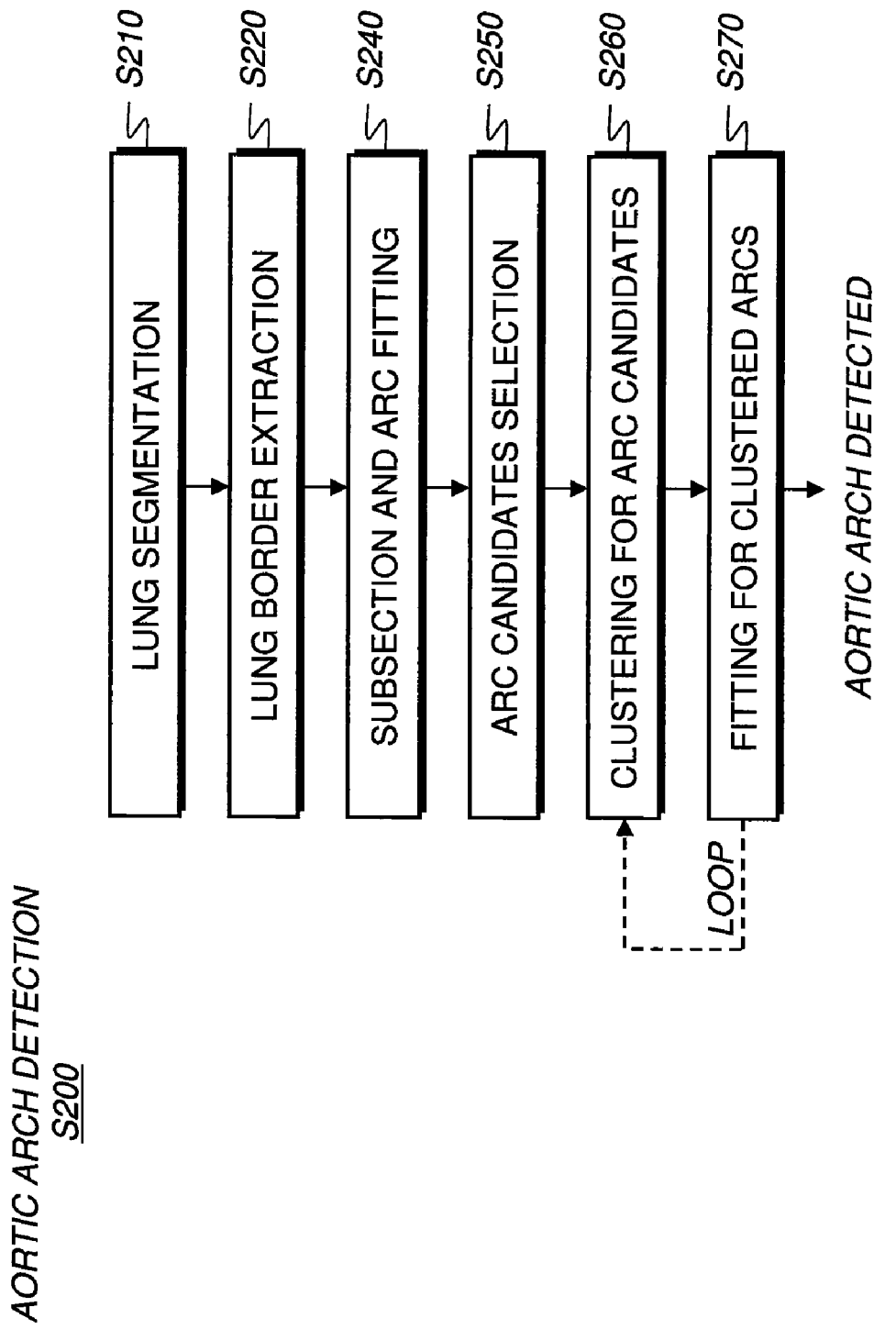

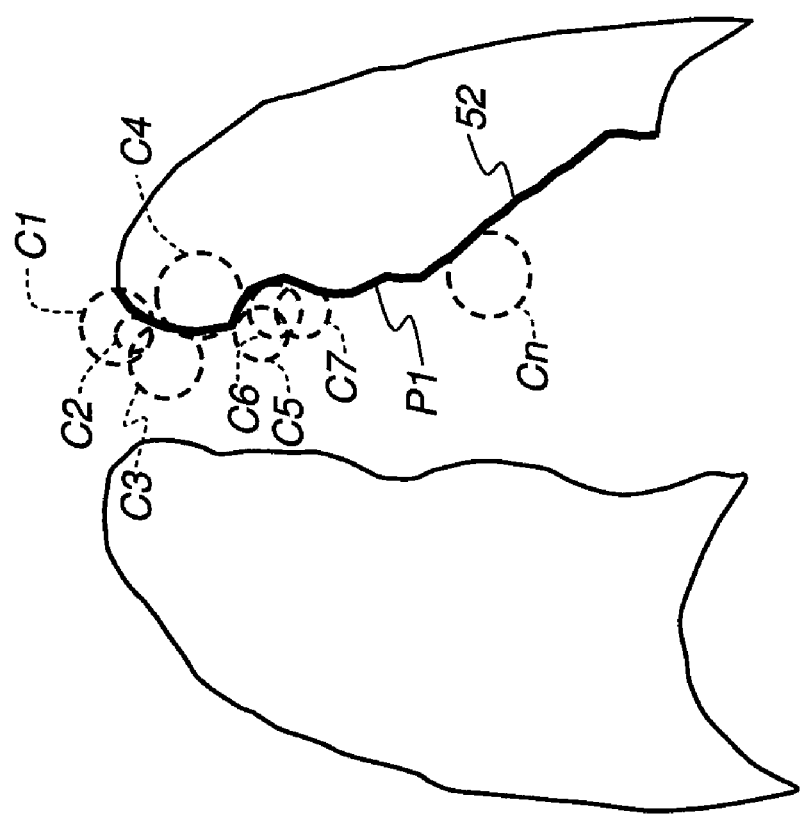

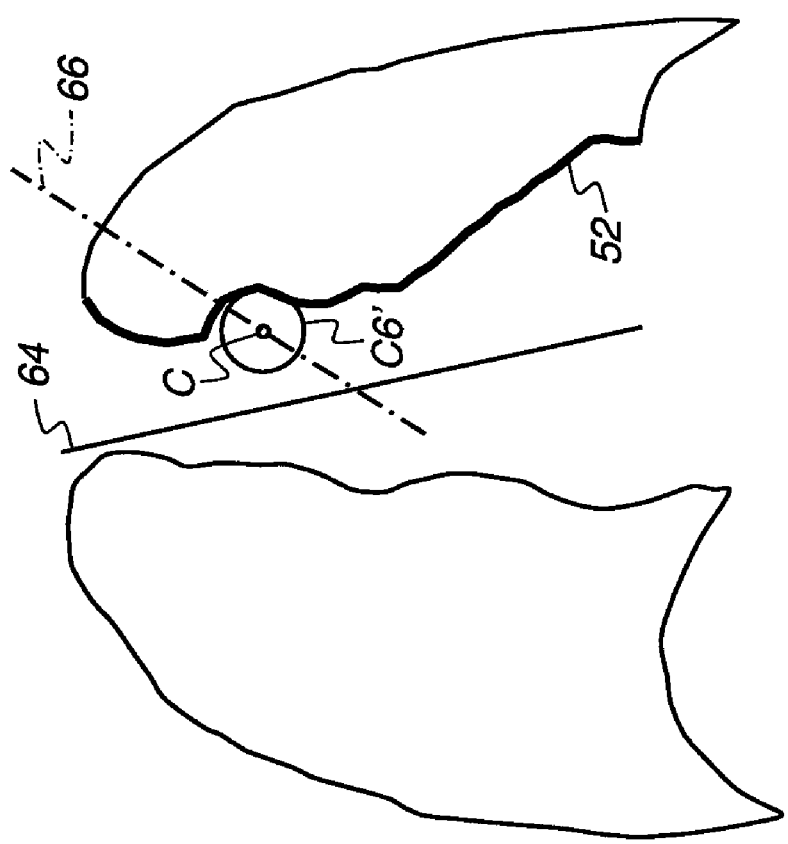

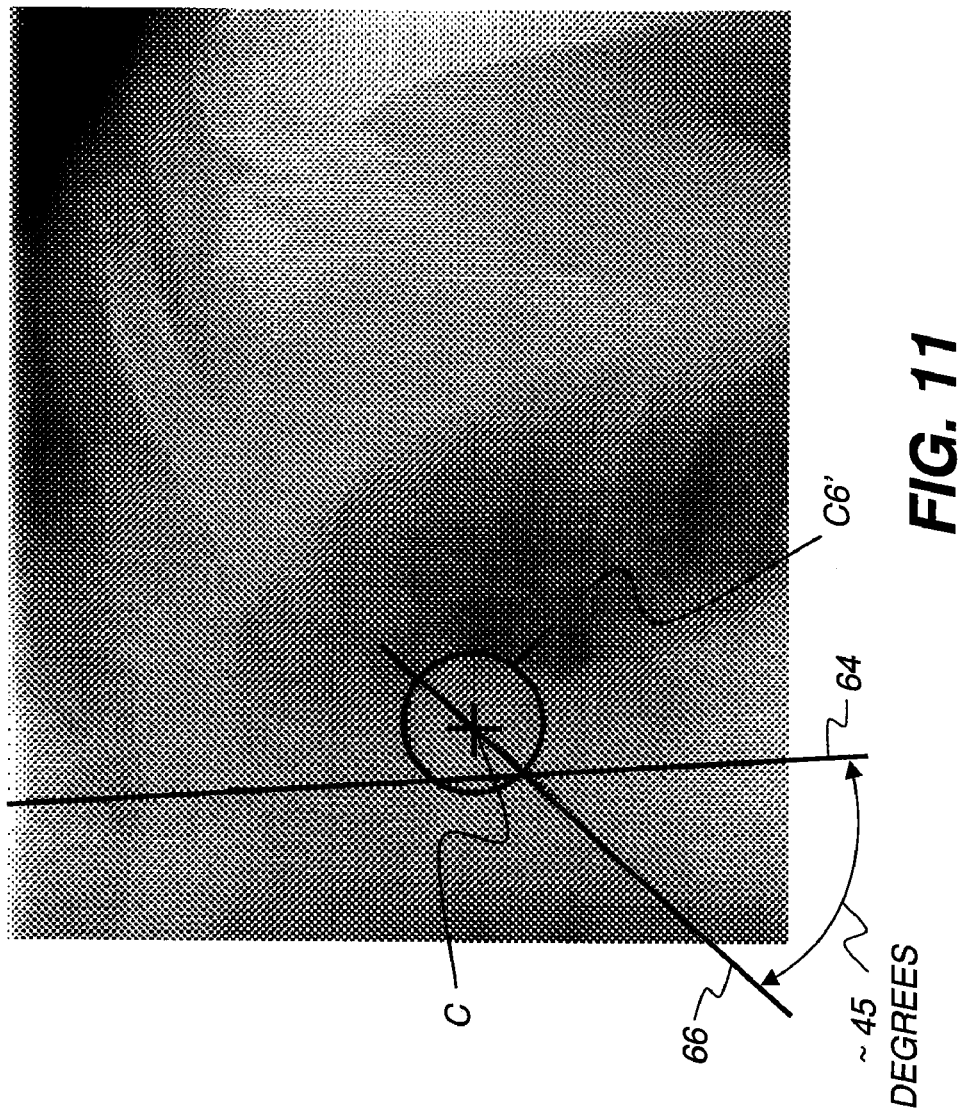

METHOD FOR DETECTING ANATOMICAL STRUCTURES

CROSS REFERENCE TO RELATED APPLICATIONS

Reference is made to and priority is claimed from the following commonly assigned pending applications:

U.S. patent application Ser. No. 11/644,858 and entitled "COMPUTER AIDED TUBE AND TIP DETECTION" by Zhimin Huo and filed 22 Dec. 2006;

U.S. patent application Ser. No. 11/942,021 and entitled "IMAGE ANALYSIS OF TUBE TIP POSITIONING" by Huo et al. and filed 19 Nov. 2007; and U.S. patent application Ser. No. 12/172,283 and entitled "COMPUTER-AIDED INTERPRETATION OF ICU PORTABLE CHEST IMAGES: DETECTION OF ENDO-TRACHEAL TUBES" by Zhimin Huo and filed 14 Jul. 2008.

FIELD OF THE INVENTION

This invention generally relates to analysis of diagnostic images and more particularly relates to detecting the location of the carina in a chest x-ray.

BACKGROUND OF THE INVENTION

Clinical evaluation of patients in an Intensive Care Unit (ICU) often relies on diagnostic images, such as portable chest radiographic images, for example. It has been noted that chest radiographs can be helpful in the ICU for indicating significant or unexpected conditions requiring changes in patient management. To meet the need for readily accessible and rapid diagnostic imaging, equipment such as portable chest radiography equipment has been developed, allowing the ICU clinician to conveniently obtain a radiographic image as needed for the patient.

Patient treatment includes the ability to detect the proper positioning of the tip of a tube that has been inserted into the patient. Possible tube types include, for example, endo-tracheal (ET) tubes, feeding (FT) tubes, and nasogastric (NGT or NT) tubes. Proper tip positioning can help to insure delivery or disposal of liquids and gases to and from the patient during a treatment procedure. Improper tip positioning, on the other hand, can cause patient discomfort, can render a treatment ineffective, or can even be life-threatening.

Detecting proper ET tube position using automated image analysis tools has proved to be challenging. Some suggest that a preferred position of the ET tube within the trachea is approximately 3-4 cm above the carina trachea that lies between the openings of the right and left principal bronchi. Flexion and extension of the patient's neck can result in ET tip migration and malpositioning. When the ET tube is malpositioned within a mainstem bronchus, complete atelectasis of the contralateral lung is likely, accompanied by difficulties with mechanical ventilation. When the ET tube is malpositioned within the superior trachea, there is a risk of accidental extubation and vocal cord injury. According to one study, ET tube malpositioning occurs in approximately 15% of patients. The use of routine post-intubation chest radiography has been recommended for detection of ET tube malpositioning for which clinical diagnosis is unreliable, since it is often difficult to identify specific pulmonary complications on the basis of clinical examination alone.

Reliable detection and identification of ET tube tip positioning can be achieved when the carina can be accurately identified. However, the carina is often masked by other details of surrounding anatomy, so that it can even be difficult to detect the carina visually in a chest x-ray. Automated detection can be even more challenging; techniques for computer-assisted carina detection have proved to be error-prone and often less accurate than desirable, making tube and tip malpositioning difficult to detect in some cases.

Thus, there is a need for a detection method with improved accuracy for locating internal structures such as the carina in a digital radiographic image.

SUMMARY OF THE INVENTION

It is an object of the present invention to address the need for improved detection of the carina and other structures in digital radiographic images. With this object in mind, the present invention provides a method for estimating the location of an anatomical structure in a diagnostic image of a patient, comprising: obtaining the x-ray data in digital format; detecting a first benchmark feature within the x-ray image; detecting a second benchmark feature within the x-ray image; locating an intersection between a first line that extends along the length of the first benchmark feature and a second line that extends through a central point related to the curvature of the second benchmark feature and that intersects with the first line at an angle that is within a predetermined range of angles; and identifying the location of the anatomical structure relative to the intersection.

It is a feature of the present invention that it uses the locations of trachea and aortic arch structures as benchmarks for locating the carina.

It is an advantage of the present invention that it uses more readily identifiable surrounding structures for locating a more difficult anatomical structure.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

FIG. 5 is a logic flow diagram of the sequence for aortic arch detection.

FIG. 9A is a plan view showing arc fitting used for aortic arch detection in one embodiment of the present invention.

FIG. 9D shows how construction lines are formed using the trachea and aortic arch detection of embodiments of the present invention.

FIG. 11 is a plan view that shows the use of construction lines traced through two identified anatomical structures for locating a third anatomical structure.

DETAILED DESCRIPTION OF THE INVENTION

It is to be understood that elements not specifically shown or described in this description may take various forms well known to those skilled in the art. The sequence of steps of the present invention are executed by a computer or other type of control logic processor that is capable of handling the required amount of image data and that is programmed with appropriate instructions for image analysis and the requisite decision-making. This control logic processor may be provided as part of conventional image processing and display system hardware or may be provided by dedicated hardware or software that accepts and processes input images.

The description that follows focuses on carina detection for detecting ET tube placement in a chest x-ray as one example of the method of the present invention. It can be appreciated that similar steps would apply for detection of tips for other types of anatomical structures in other types of x-ray or other diagnostic images, with the necessary adaptation for surrounding anatomy and other features in the diagnostic image.

In the context of the present invention, a feature or shape within a diagnostic image is considered as substantially linear if it exhibits little or no curvature, so that any center of curvature for a curve that is fitted to the contour of the linear feature or shape would lie outside the boundary of the image and any radius of curvature for a curve fitted to the substantially linear shape would exceed the width of the diagnostic image.

In the clinical setting, it is recognized that merely detecting the path of a tube and its tip in an x-ray or other type of diagnostic image is not sufficient for determining whether or not the tubing device is able to perform its function. For the attending medical personnel, it is desired to ascertain that the tip of a tube is at the proper position relative to the patient's anatomy. The method of the present invention takes this into account and provides the attending medical staff with a probabilistic assessment of tip positioning suitability for the particular patient. Embodiments of the present invention then expand upon this particular application to apply the method of the present invention to the broader problem of detecting other types of anatomical structure.

Figure 1:
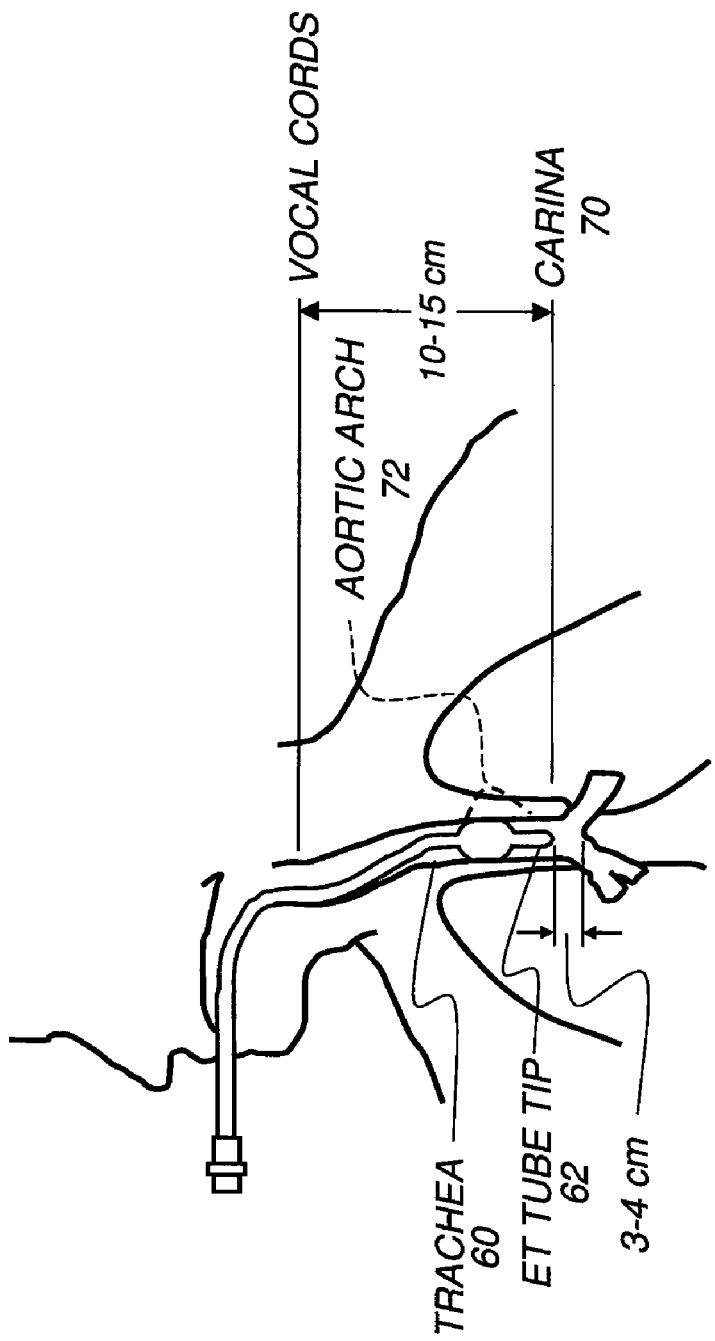
FIG. 1 is a schematic diagram showing spatial relationships and dimensions for ET tube positioning in a patient.

The diagram of FIG. 1 shows a number of significant anatomical structures and dimensions of interest for determining proper positioning of an ET tube tip 62 within the trachea 60 of a patient, relative to the carina 70. One characteristic that is addressed in various embodiments of the present invention is the close proximity of the aortic arch, visible within a radiographic image near the curved dashed line indicated at 72 in FIG. 1.

Figure 2:
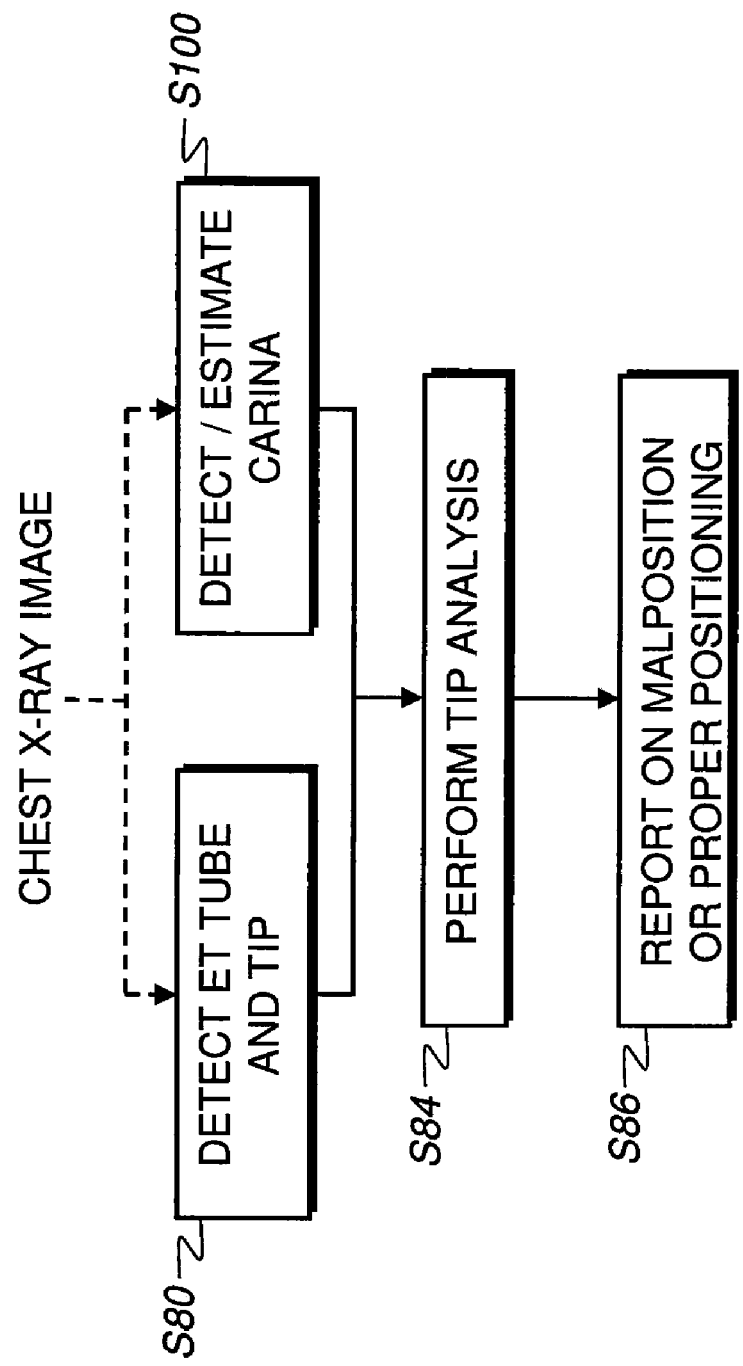
FIG. 2 is a logic flow diagram showing the overall process for detecting the position of ET tubing within a patient.

The logic flow diagram of FIG. 2 shows stages in determining proper tip and tube position in a chest x-ray image, using the anatomical structures and other physical features shown in FIG. 1. In a tube and tip detection step S80, the image is analyzed to determine the path of the ET tube and the location of its tip 62. Image processing for step S80 can use, for example, procedures described in commonly assigned co-pending applications entitled "Computer-Aided Tube and Tip Detection" Ser. No. 11/644,858 and entitled "Computer-Aided Tubing Detection" Ser. No. 12/172,283 by Huo et al. A carina estimation process S100 can use, for example, procedures described in the commonly assigned co-pending application entitled "Image Analysis Of Tube Tip Positioning" Ser. No. 11/942,021 by Huo et al. Carina estimation process S100, described in more detail subsequently, also operates on chest x-ray image data in order to detect the position of the carina. A tip analysis step S84 then determines the distance between tip 62 of the ET tube and carina 70. Given this data, a position analysis step S86 can then report on proper or improper tube tip positioning, such as by issuing an alert in the event that malpositioning is detected. Position analysis step S86 can use a variety of tools and techniques, including a training database in applications that "teach" the program to correctly identify tube position.

Carina estimation process S100 can be implemented in a number of ways. In one embodiment, results of actual carina detection and estimated carina location, as described herein, can be compared and used together in order to more accurately locate the carina position within an image. For example, the results of two separate algorithms can be compared against each other, wherein a first algorithm locates an anatomical structure according to its identifiable characteristics and a second algorithm provides a more probabilistic estimate of structure location based on detectable characteristics of surrounding anatomical features and other structures.

Embodiments of the present invention utilize various geometric relationships between two or more "benchmark" anatomical or other features, such as a spine or detected ET tube, for example, that have been shown to be useful for estimating the location of a desired anatomical structure that can be more difficult to detect in the image data. These embodiments operate by identifying the benchmark features and then forming "construction lines" according to their detected shapes, wherein a relationship between the construction lines, such as a given angular relationship, is a convenient tool for estimating the location of other anatomical structures. In the example embodiment described herein, the intersection of the construction lines then locates a point that approximates the location of a particular anatomical structure or that can be used to more accurately estimate the position of the anatomical structure. For embodiments of the present invention, trachea 60 and aortic arch 72 (FIG. 1) serve as benchmark features that can be identified with some accuracy and are then used to help estimate carina 70 location.

Estimating Carina Location

Embodiments of the present invention locate two benchmark features, the trachea and the aortic arch, from a chest x-ray image and use their relative geometrical relationship in order to obtain an estimate for position of the carina. This result can then be used with other image analysis and presentation tools that display the x-ray image and particularly with utilities for detection and display of ET tube and tube tip positioning, as described earlier with reference to FIG. 2.

Figure 3:
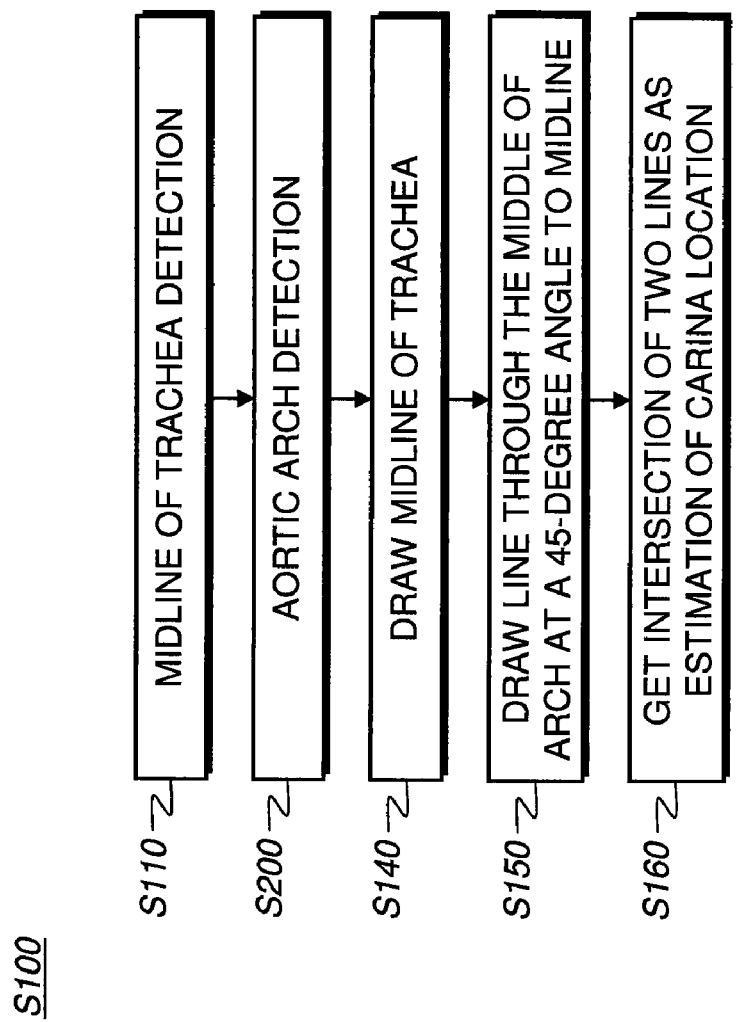
FIG. 3 is a logic flow diagram that shows the overall sequence for carina location using aortic arch and trachea detection in one embodiment of the present invention.

As noted earlier in the Background material, proper ET tube placement is within a given distance relative to the position of carina 70 (FIG. 1). The logic flow diagram of FIG. 3 shows the sequence of steps used to estimate carina location from a chest x-ray in one embodiment of carina estimation process S100 of the present invention. A trachea detection step S110 detects the trachea and detects the location of the ET tube and tip. This step may use, for example, the tube and tip detection method disclosed in commonly assigned copending applications Ser. No. 11/644,858 entitled "Computer-Aided Tube and Tip Detection" and Ser. No. 11/942,021 entitled "Image Analysis Of Tube Tip Positioning", noted earlier. Trachea detection may also interpolate trachea position from the position of the ET tube, where this has been detected. The position of the spine can alternately be used as a benchmark feature or guide to trachea location. Further, for images with an inserted ET tube, the detected ET tube or a portion of the detected ET tube, for example, the top 30%-50% of the detected ET tube, can be used alternatively as a benchmark feature or as a guide to trachea location. An aortic arch detection step S200 is then executed for identifying distinctive characteristics of the aortic arch, as a second benchmark, in the radiographic image. Aortic arch detection step S200, introduced in FIG. 3, is described in more detail subsequently.

Figure 4B:
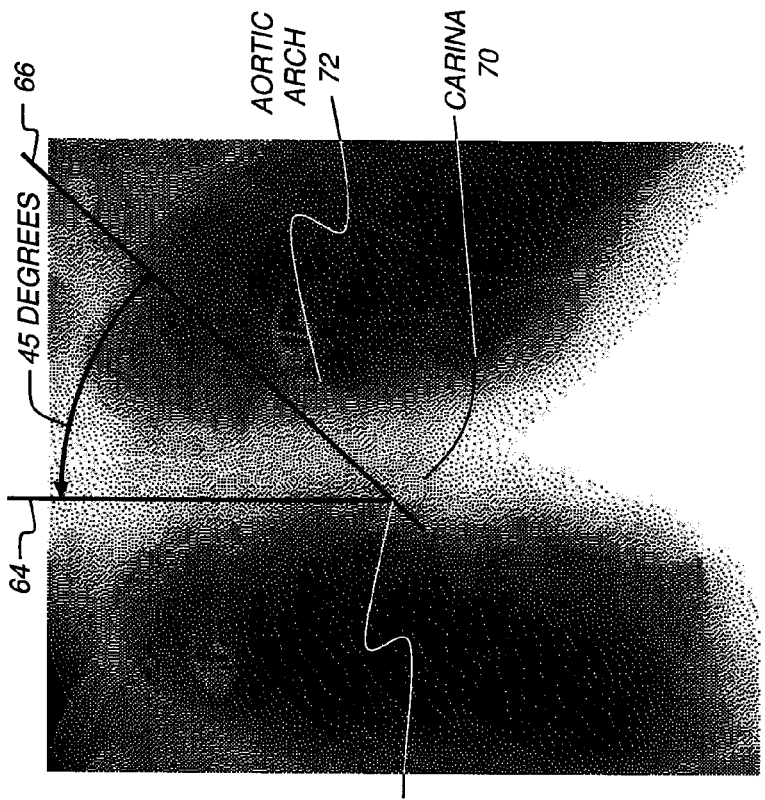
FIGS. 4A and 4B are example radiographic images showing how aortic arch and trachea detection can be used to locate the carina.
Figure 4A:
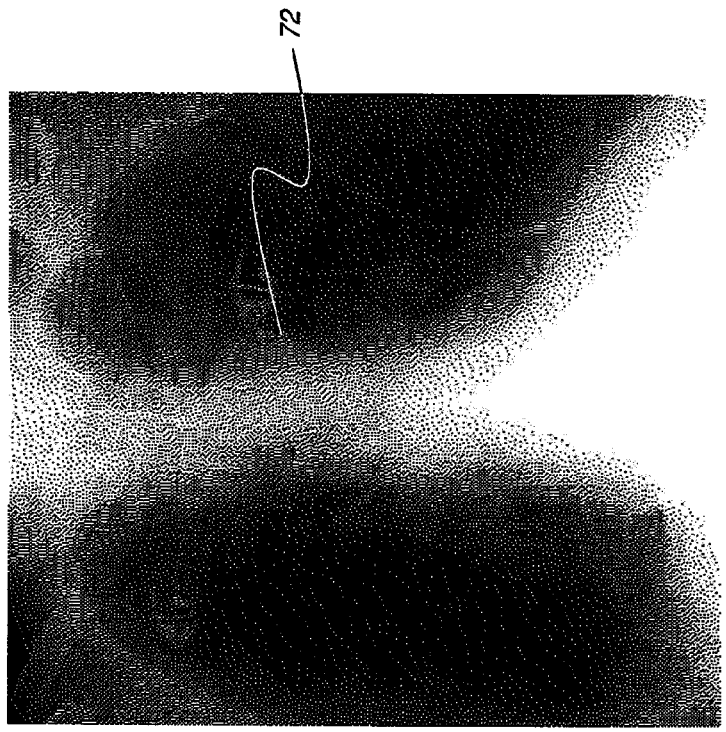

Continuing with the sequence of FIG. 3, and referring to the example image shown in FIGS. 4A and 4B, once aortic arch 72 (FIG. 1) and trachea 60 have been detected, two tracing steps are executed, forming two intersecting construction lines 64 and 66 in order to estimate the location of carina 70. A midline tracing step S140 generates first construction line 64 using the trachea or another appropriate linear feature that lies at least substantially parallel to the trachea. In one embodiment, in which the trachea itself can be detected, step S140 generates first construction line 64 along the length and through the middle of the trachea. Alternately, first construction line 64 can be extended using other features as a guide, such as along the length and through the detected ET tube that is within the trachea or along the detected spine that is at least substantially parallel to the trachea. An angle detection step S150, using aortic arch 72 as a second detected feature, then traces second construction line 66 from a central point related to a radius of curvature of aortic arch 72, and at an angle of about 45 degrees from first construction line 64. The intersection of construction lines 64 and 66 then provides an estimate of carina 70 proximity that has been shown empirically to have a high level of accuracy.

Detecting Aortic Arch

As is shown in the block diagram of FIG. 3 and example of FIGS. 4A and 4B, detection of aortic arch 72 is useful for locating the carina in embodiments of the present invention. The use of aortic arch 72 as a geometric reference feature requires a suitable approach for its accurate detection. As shown in FIGS. 4A and 4B, aortic arch 72 is visible in the x-ray along the inner edge of the left lung. It should be noted that, since an x-ray is being viewed, the left lung appears at the right side in the radiographic image.

Figure 6:
FIG. 6 is a plan view of an original radiograph for a patient having an inserted ET tube.

The block diagram of FIG. 5 shows the sequence of steps used for aortic arch detection step S200 in one embodiment of the present invention. Subsequent FIG. 6 and following illustrate the various steps of this sequence. FIG. 6 shows the original x-ray image prior to aortic arch or carina estimation. It can be appreciated that the carina itself would be very difficult to detect in the image shown in FIG. 6.

Figure 7:
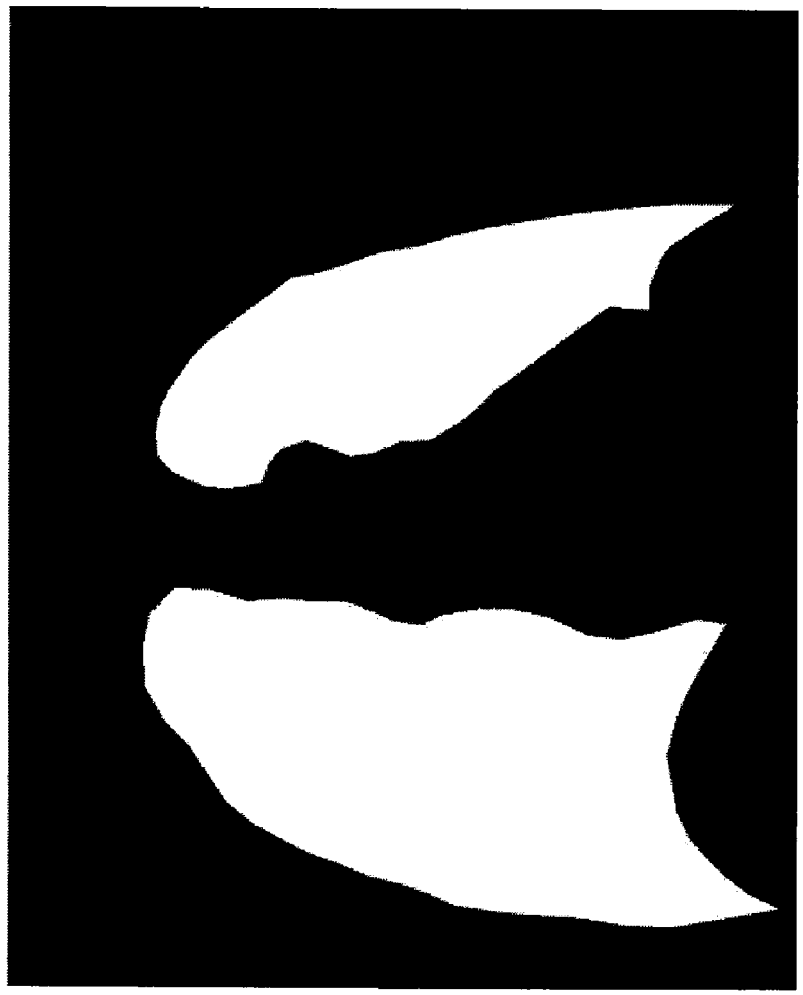
FIG. 7 is a plan view showing a mask formed for lung segmentation in an example embodiment.

Referring to FIG. 5, a lung segmentation step S210 obtains a lung mask by analyzing the image content. FIG. 7 shows a lung mask 50 as generated from analysis of the image of FIG. 6. In one embodiment, thresholding is used as a straightforward technique to form the outline of mask 50. Density values above (that is, darker than) a threshold value are considered to be background values. Further image processing operations such as erosion and dilation are used to remove holes and smooth and define the area and outline of mask 50 more completely. Alternately, more complex tools, such as an Active Shape Model (ASM) technique, known to those skilled in the image processing arts, could be used for lung segmentation step S210. ASM methods are described, for example, by Tim Cootes in *Image Processing and Analysis*, Ed. R. Baldock and J. Graham, Oxford University Press, 2000, in the chapter entitled "Model-Based Methods in Analysis of Biomedical Images" pages 223-248. Mask 50 formed in this step can then be used to segment the lungs from other structures in the x-ray image and thus simplify and streamline subsequent processing. Other types of masks could be used, applying techniques familiar to those skilled in defining regions of interest (ROIs) in diagnostic images.

Still following the flow of FIG. 5, a lung border extraction step S220 follows. For this step, utilities such as Canny edge detection are used to identify lung edges, providing edge extraction as shown in the example of a lung edge image 58 in FIG. 8.

Figure 8:
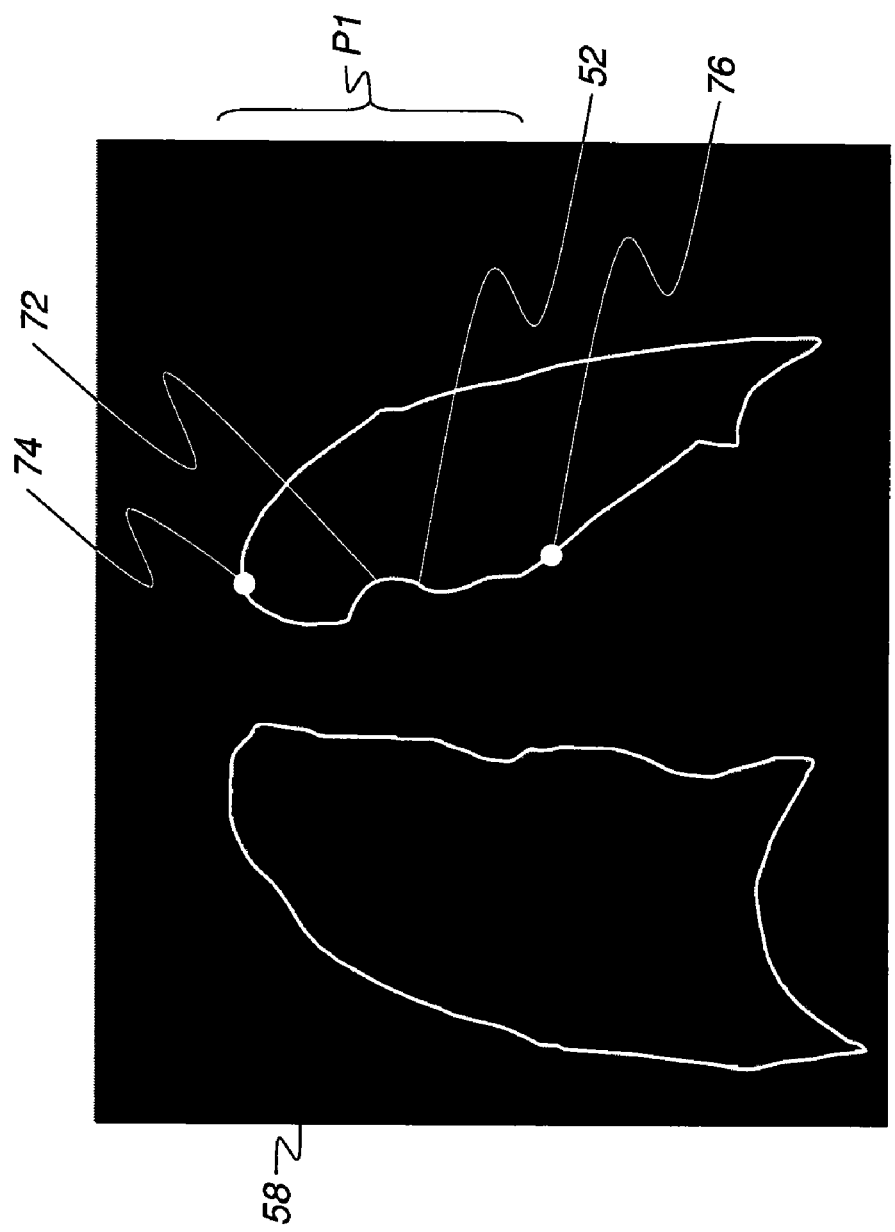
FIG. 8 is a plan view that shows extraction of the lung border from the original image.

With the lung border extracted as shown in FIG. 8, aortic arch 72 is most readily detected at a position along an inner (left) edge 52 of the left lung. Again, it should be noted that, as it appears in the x-ray, this is the left edge of the lung that appears on the right. In an inner-edge subsection and arc-fitting step S240, inner (left) edge 52 of the left lung is located and processed in order to identify arc segments of circles that map to the curvature or contour of aortic arch 72.

In one embodiment, inner-edge subsection and arc-fitting step S240 uses the following sequence for processing lung edge image 58:

(i) Set the length of a subsection to be a predetermined value of L pixels. In one embodiment, L=20.

(ii) Scan an upper portion P1, such as the top half from point 74 to point 76 in FIG. 8, of lung edge image 58 to obtain the first row and successive rows of pixels that contain the inner (left) lung edge 52.

(iii) Obtain and store successive segments of inner (left) lung edge 52, each of length L, except for the last segment that may have length≦L. Do this beginning at starting-point 74 and progressively moving toward ending-point 76 in units of L pixels. Value L is sized so that only small segments of lung edge 52 are obtained.

Referring again to the logic flow diagram of FIG. 5, arc fitting is next executed as part of step 240 for each successive segment that was stored as a subsection. FIG. 9A shows what this processing intends to achieve. For every curved segment of inner lung edge 52 consisting of a set of discrete points $\{x_i, y_i\}$, i=1, 2, ..., n, (where n=L) this process attempts to fit an arc to that segment and to identify the circle containing that arc. This is equivalent to calculating a circle represented by $(x_0, y_0, R)$ to minimize the objective function:

$$F = \sum_{i=1}^{n} ((x_i - x_0)^2 + (y_i - y_0)^2 - R^2)^2.$$

This gives a set of values $(x_0, y_0, R)$ and a corresponding value of objective function F for each subsection. Because aortic arch 72 has a distinctive curvature associated with an arc from a circle along the inner (left) side, that is, outside the lung field, only arcs related to circles from this side are of interest when using this iterative technique. Arcs and circles that are formed along the outer (right) side, within the lung field such as circle C4 in the example of FIG. 9A, can be ignored for this processing.

Figure 9B:
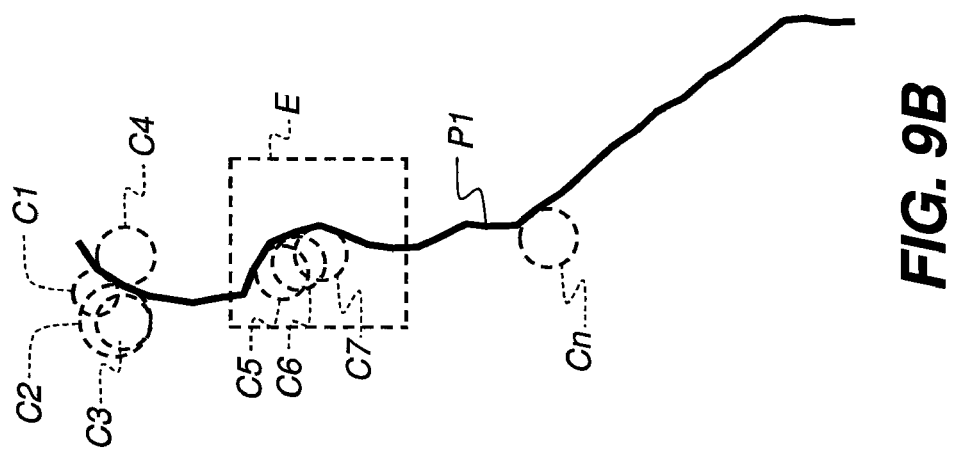
FIGS. 9B shows the process of defining candidates for arc fitting and clustering.

As shown in FIG. 9A, a number of circles labeled C1, C2, C3, ... Cn are formed as the succession of arcs of an upper portion P1 of inner (left) edge 52 are traced. Portion P1 is shown enlarged in FIG. 9B, with circles C1-Cn that were generated for matching curvature along the top part of this outlined portion.

Referring again to the logic flow diagram of FIG. 5, an arc candidate selection step S250 executes. For detection of the aortic arch, the following substeps are used in one embodiment:

(i) Select each arc whose corresponding circle lies outside the lung field. In the example of FIG. 9B, this includes arcs associated with circles C1, C2, C3, C5, C6, C7, and Cn.

(ii) Validate if the arc is acceptable according to size by using predetermined thresholds for arc radius $R_{max}$ and $\epsilon$.

If radius $R<R_{max}$ and $F<\epsilon R^2$, select it as a candidate.

Values of $R_{max}$ and $\epsilon$ can be increased for fitting larger arcs in subsequent iterations of these substeps.

The next step in the sequence of FIG. 5 is an arc candidates clustering step S260. As part of this step, arc circle candidates that were considered acceptable in preceding step S250 are grouped according to location and other factors. Clusters of arcs that are adjacent or very near each other can be grouped to redefine the shape of left edge 52.

Figure 9C:
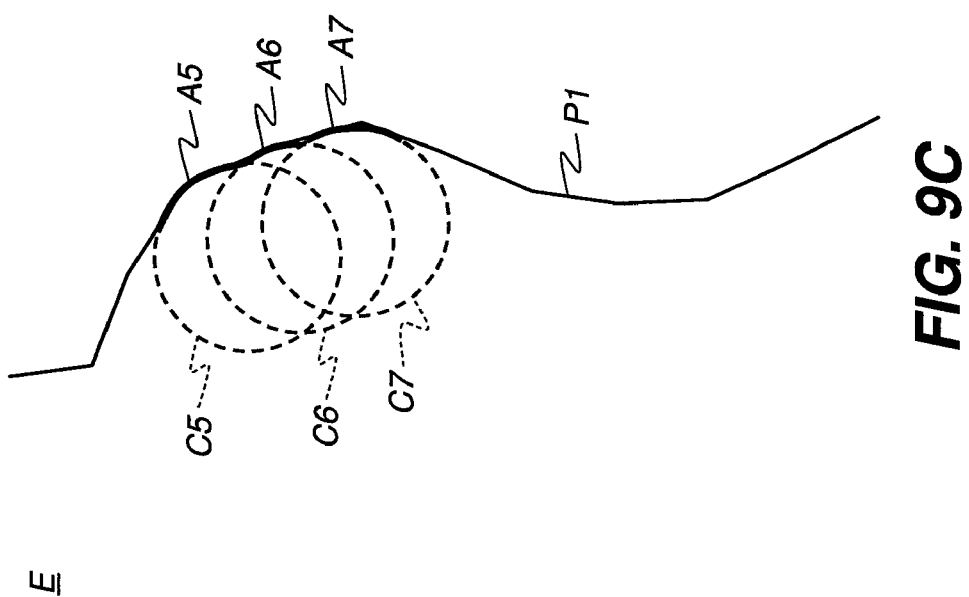
FIG. 9C shows arc fitting and clustering in enlarged detail.

By way of example, FIG. 9B shows a grouping or cluster of arcs C5, C6, and C7 outlined in an area E that is enlarged in the view of FIG. 9C. Here, circles C5, C6, and C7 have corresponding arcs A5, A6, and A7 that can be fitted to upper portion P1. Fitting arcs A5, A6, and A7 to this curvature forms a fitted curvature that can then be used iteratively in one or more additional fitting operations as part of clustering step S260. An arc fitting step S270 then fits clustered arcs meeting acceptability criteria, related to relative size and proximity to other arcs, to the curvature of upper portion P1. In one embodiment, for example, arcs whose corresponding circles overlap or whose centers are within a predetermined distance of each other are clustered.

As indicated by the dashed line in FIG. 5, clustering step S260 and arc fitting step 270 can then optionally be repeated one or more times, each iteration providing a fitted edge formed by successive arcs. Arc-fitting methods for shape detection are well known to those skilled in the image analysis arts.

With one or more repeated iterations, each successive iteration working with larger arc radii, this processing is capable of identifying the contour of the aortic arch as a benchmark feature for subsequent detection of the carina. False positives are readily detected and can then be removed, due to their relative position along upper portion P1 and the relative radius of a fitted circle For the example shown in FIG. 9D, fitted circle C6' appears to have the correct size and positional characteristics for the contour of the aortic arch. Arc fitting with successive iterations can help to speed subsequent processing for aortic arch detection and to improve overall detection accuracy.

Figure 10B:
FIGS. 10A and 10B are plan views of templates of different radii used for detecting a circular feature in one embodiment.
Figure 10A:

As an alternative, template matching to a segment of a circular disk with predetermined radius similar to the size of aortic arch can be used to detect the aortic arch in the region along the inner border of the left lung. FIGS. 10A and 10B show representative disk segments of different radii used as templates for this purpose. In one embodiment, for example, templates vary over a range of different radii values or the radius value of a template is increased for each in a series of detection and matching operations in order to locate the aortic arch.

As yet another alternative for fitting a shape to a curved anatomical feature, polynomial fitting techniques could be used, as is well-known to those skilled in the image analysis arts. Polynomial fitting methods could also be combined with arc detection and fitting techniques such as those described with reference to FIGS. 9A-9D.

Forming Construction Lines

The circle that identifies the aortic arch, shown as circle C6' in the examples of FIG. 9D, and in FIG. 11, is then useful for detection of the carina. Referring to FIGS. 9D and 11, once the circle having the appropriate radius and location for the aortic arch is obtained, construction lines 64 and 66 can be traced, as was described earlier with respect to FIG. 4B. Construction line 66 extends through a central point related to the curvature of the aortic arch, such as the center C of circle C6' in the example of FIG. 9D, for example, or some other central point used as a reference for a curved surface, and intersects construction line 64 at the middle of the trachea at an angle within a predetermined range. For carina detection, these lines intersect substantially at a 45 degree angle, that is, at an angle between 54 and 36 degrees, more preferably between 50 and 40 degrees, and most preferably as close to 45 degrees as possible. Carina 72 lies generally along the midline of the trachea that is marked by construction line 64 and is estimated to be at, or very near, the intersection of construction lines 64 and 66, as was shown in FIG. 4B. Alternately, construction line 64 can align with the trachea and be approximately centered within the trachea; this is the case, for example, in an embodiment that uses the spine as a feature for obtaining line 64.

By using a combination that detects and traces the midline of the trachea and detects the aortic arch as benchmark features, the method of the present invention provides a more accurate way to locate the less visible carina than is provided using conventional image processing methods that employ pattern detection, thereby improving the performance of image processing logic that senses ET tubing and tube tip position.

FIG. 11 shows an example in which both construction lines 64 and 66 are shown on a display, such as on a high-resolution display visible to the technician or radiologist. Any or all of the lines or other structures that are used to locate portions of the anatomy may be displayed to the observer, such as one or both construction lines 64 and 66, circle C6', center C, or other structure.

The general principles that are used in this detection processing, tracing construction lines that extend through portions of more readily identifiable benchmark features and considering their intersection or other suitable relationship between them, can be used to solve similar imaging problems for locating other types of internal anatomical structures. In the particular case of ET tubing, the trachea provides a useful reference anatomic feature whose length-wise midpoint can be identified with sufficient accuracy using conventional image analysis techniques. Extending a length-wise construction line through its middle portion enables a base, benchmark, or reference datum to be established using this feature. This is particularly useful in this example, because the carina itself is located along that same line that extends down the middle of the trachea. An appropriate shift in this location may be used where the spine is used as a linear guide for forming construction line 64.

It can be appreciated that the methods of the present invention provide an estimate of location of an anatomical structure such as the carina. However, due to factors such as patient size and positioning, such an estimate may not be sufficiently accurate in each case. Some amount of additional fine-tuning may be useful, beginning with these results. This may include further image processing, for example.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the method of the present invention can work with digital image data from a radiological image that is obtained directly from a digital radiography (DR) sensor or may operate using image data that was obtained from scanned film or from scanning a computed radiography (CR) cassette. Embodiments of the present invention can also be used for detecting anatomical structures in other types of diagnostic images. Various types of supplemental image processing may be used in conjunction with processing and methods of the present invention, in order to heighten detection accuracy for various anatomical structures, such as contrast enhancement for example. Additional image processing can be used to position the carina at the center of a Region of Interest (ROI), for example, as well as to highlight or add contrast to the local area around the carina. Alternate methods for detecting the aortic arch include use of a template, such as a Haar-like template, for example.

Thus, what is provided is a method for detecting an anatomical structure in a digital radiography image using detection of first and second benchmark features in the image and tracing construction lines between them.

PARTS LIST

50. Lung mask
52. Left edge
58. Lung edge image
60. Trachea
62. Tip
64, 66. Construction line
70. Carina
72. Aortic arch
74. Starting-point
76. Ending-point
S80. Tube and tip detection step
S84. Tip analysis step
S86. Position analysis step
S100. Carina estimation process
S110. Trachea detection step
S140. Midline tracing step
S150. Angle tracing step
S160. Carina detection step
S200. Aortic arch detection step
S210. Lung segmentation step
S220. Lung border extraction step
S240. Inner-edge subsection and arc fitting step
S250. Arc candidates selection step
S260. Arc candidates clustering step
S270. Arc fitting step
A5, A6, A7. Arc
C. Center
E. Area
P1. Portion
C1, C2, C3, C4, C5, C6 C6', C7, Cn. Circle

The invention claimed is:

1. A method for estimating a location of an anatomical structure in a diagnostic image of a patient, comprising:
   detecting a first benchmark feature within an x-ray image in a digital format;
   detecting a second benchmark feature within the x-ray image;
   applying, by a processor, at least one template to the x-ray image to determine a curvature of the second benchmark feature;
   locating an intersection between a first line that extends along a length of the first benchmark feature and a second line that extends through a central point related to the curvature of the second benchmark feature and that intersects with the first line at an angle that is within a predetermined range of angles; and
   identifying the location of the anatomical structure relative to the intersection.

2. The method of claim 1 wherein the first benchmark feature is a trachea.

3. The method of claim 1 wherein the first benchmark feature is a tube inserted into a trachea.

4. The method of claim 1 wherein the first benchmark feature is a spine of the patient.

5. The method of claim 1 wherein the first benchmark feature is substantially linear.

6. The method of claim 1 further comprising displaying either or both of the first line and the second line on a display.

7. The method of claim 1 wherein the second benchmark feature is an aortic arch of the patient.

8. The method of claim 7 wherein detecting the aortic arch comprises:
   identifying an inner edge of a left lung within the x-ray image; and
   processing the inner edge using the at least one template.

9. The method of claim 7 wherein detecting the second benchmark feature further comprises segmenting lungs within the x-ray image.

10. The method of claim 7 wherein identifying an inner edge of a left lung within the x-ray image comprises applying a Canny edge detection algorithm.

11. The method of claim 7 further comprising displaying the aortic arch on a display.

12. A method for detecting a curved feature within an image comprising:
   analyzing, by a processor, the image to isolate a feature in the image;
   identifying an edge of the feature within the image;
   identifying successive subsections of the identified edge by subsectioning the identified edge according to a predetermined subsection dimension;
   fitting one or more arcs to each subsection of the identified edge, wherein each of the one or more fitted arcs has a center of radius that lies to the same side of the identified edge and an arc radius that is within a predetermined range of radius values;
   clustering two or more fitted arcs according to their proximity relative to each other;
   forming a fitted edge by combining portions of the two or more clustered fitted arcs for the identified edge; and
   fitting at least one additional arc to the fitted edge.

13. The method of claim 12 wherein the feature corresponds to a lung and wherein the identified edge corresponds to an inner edge of the lung.

14. A method for estimating a location of a carina in a chest x-ray image of a patient, comprising:
   obtaining x-ray data in a digital format;
   analyzing, by a processor, the x-ray data to identify a trachea and lungs in the x-ray data and to determine a curvature of an aortic arch from the lungs identified in the x-ray data, wherein a mask is utilized to identify lungs; and
   locating an intersection between a first line that traces a length of the trachea and a second line that extends toward the first line from a center point related to the radius of curvature of the aortic arch and intersects the first line at an angle that is between 54 and 36 degrees.

15. The method of claim 14 wherein the first line is formed using a path of a spine identified in the x-ray data.

* * * * *

UNITED STATES PATENT AND TRADEMARK OFFICE
CERTIFICATE OF CORRECTION

PATENT NO.         : 8,189,886 B2
APPLICATION NO.    : 12/190616
DATED              : May 29, 2012
INVENTOR(S)        : Zhimin Huo et al.

It is certified that error appears in the above-identified patent and that said Letters Patent is hereby corrected as shown below:

Column 9, line 51        Please replace the words "The invention claimed is:" with the word
                         --CLAIMS:--

Signed and Sealed this
Nineteenth Day of March, 2013

Teresa Stanek Rea
*Acting Director of the United States Patent and Trademark Office*